United States Patent [19]

Fels

[11] 4,278,283
[45] Jul. 14, 1981

[54] LOAD TRANSPORT CARRIAGE

[76] Inventor: Karl Fels, Albert-Stolte-Str. 35, D-4290 Bocholt-Suderwick, Fed. Rep. of Germany

[21] Appl. No.: 52,061

[22] Filed: Jun. 25, 1979

[51] Int. Cl.³ .............................................. B62C 1/06
[52] U.S. Cl. ...................................... 296/26; 280/641
[58] Field of Search ............................ 296/20, 26, 27; 280/DIG. 8, 641, 27; 414/466, 499, 501

[56] References Cited

U.S. PATENT DOCUMENTS

| | | | |
|---|---|---|---|
| 2,254,437 | 9/1941 | Marney | 296/26 |
| 2,490,014 | 12/1949 | De V. Brand | 296/26 |
| 2,549,018 | 4/1951 | Sarlo | 296/26 |
| 2,809,046 | 10/1957 | Andersson | 296/26 X |
| 2,877,047 | 3/1959 | Weil | 296/20 |
| 3,057,655 | 10/1962 | Weil | 296/20 |
| 3,151,752 | 9/1964 | Muldoon | 414/466 |
| 3,669,031 | 6/1972 | Cole | 280/641 X |
| 3,837,508 | 9/1974 | Stefanelli | 415/501 X |

FOREIGN PATENT DOCUMENTS

| | | |
|---|---|---|
| 138204 | 8/1901 | Fed. Rep. of Germany ............ 296/26 |
| B 6263108 | 1/1953 | Fed. Rep. of Germany . |
| 2651039 | 5/1978 | Fed. Rep. of Germany ............ 296/26 |
| 2635238 | 6/1978 | Fed. Rep. of Germany ............ 296/26 |

Primary Examiner—John P. Silverstrim
Assistant Examiner—Norman L. Stack, Jr.
Attorney, Agent, or Firm—Kinney, Lange, Braddock, Westman & Fairbairn

[57] ABSTRACT

A load transport carriage, designed to be carried by a truck, having two pairs of wheels, one being a front pair which is located at a relatively higher level and the other a rear pair which is at a lower level. The wheels of the lower pair are hinged to a carriage frame that is pivotable and lockable in its upper position. Locking mechanism is provided for locking the carriage in an upright position, this locking mechanism including one or more feeler wheels which engage the rear of the truck as the carriage is moved onto the truck and which operate to adjust the length of an adjustable strut connected between the pivotal legs carrying the rear wheels and the carriage frame. The locking mechanism may be either a mechanical locking mechanism or a hydraulic locking mechanism involving a check valve which permits fluid to flow in only one direction into a piston chamber.

8 Claims, 2 Drawing Figures

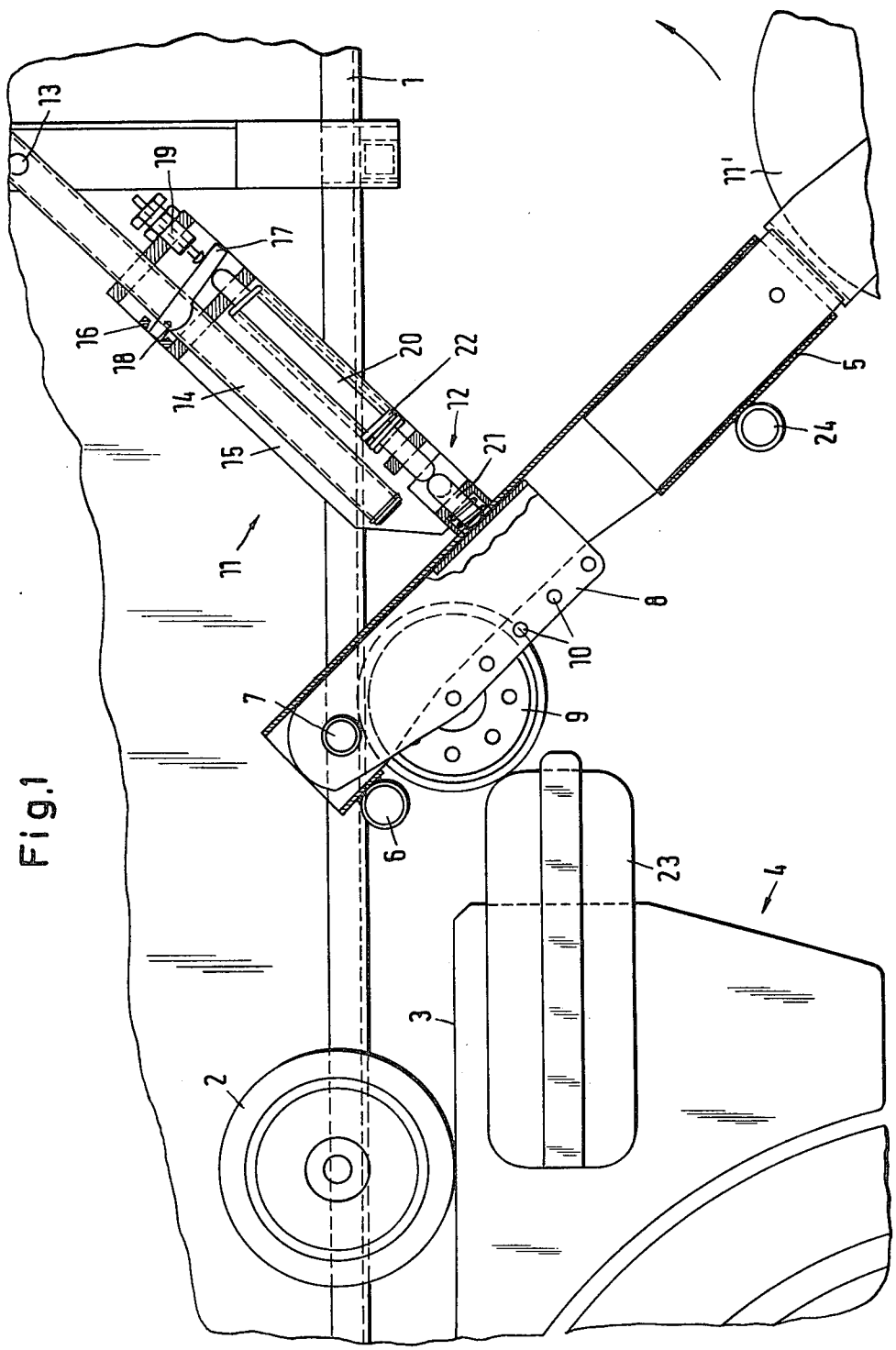

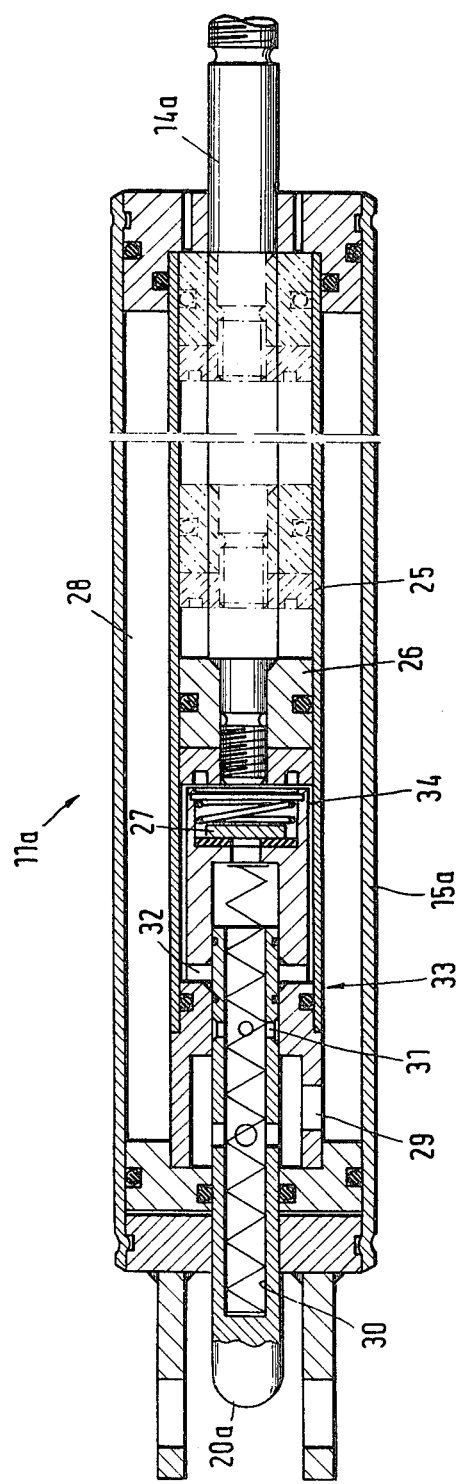

LOAD TRANSPORT CARRIAGE

BACKGROUND OF THE INVENTION

The invention concerns a load transport carriage which, in particular, is carried by a truck. The carriage has two pairs of wheels disposed on the carriage at two levels, in which the front pair, which are the upper wheels, is journaled on the carriage frame and in which the lower rear pair of wheels is hinged to the carriage frame through a pair of legs that are pivotable and lockable in the upright position. When the locking mechanism for the legs is released, the rear pair of wheels and the associated legs can be pivoted upwardly so that the wheels of the upper pair support the load transport carriage. Locks which are operable independently of each other are associated with the legs. Arranged ahead of each leg for releasing its lock is a feeler wheel disposed at the upper level.

A load transport carriage of this type is old, being shown in the German "Offenlegungsschrift" No. 26 51 039. In this known carriage, the legs, in the tilted down condition, are locked by a one-sided shaped lock, whose lock engages in a pointed gear tooth system that is fitted about the hinge point of the leg. If this type of load transport carriage is driven down off the loading surface of a truck, the legs actually tilt downwardly after leaving the loading surface, but not always completely up to the end position, but rather into an in-between diagonal position since the truck, because of the weight of the load, frequently sits lower and, because of this, the wheel located at the end of the leg reaches the ground too soon. In this diagonal position of the leg, the locking device of the known load transport carriage did result in a locking position for the leg, but was often so highly stressed that parts broke.

SUMMARY OF THE PRESENT INVENTION

The object of the present invention is to improve a load transport carriage of the initially mentioned type such that, in addition to a simpler construction, the locking device operates more reliably and can support greater forces, especially in the diagonal position of the leg. This object is accomplished in accordance with the present invention by disposing feeler wheels at the top of the legs and structured as drive-up wheels which, when driving up, swing the legs up to the upper level associated with the upper set of wheels and, in the upwardly swung position of the legs, support the load transport carriage. A strut hinged to each leg, at the level of or below the feeler wheel, is provided for locking the lower legs. The other end of each strut is hinged to the carriage frame. The struts are adjustable in length and the length adjustment is lockable in the direction in which the strut becomes shortened.

The length-adjustable strut is secured to the leg at a substantial distance from the hinge point of the leg so that very high forces, particularly in the diagonal position of the leg, can be supported. Moreover, a very simple and reliably operating construction is achieved since the feeler wheels are simultaneously structured as drive-up wheels and operate the locking device directly.

In one constructionally simple and reliably operating example of the embodiment, the strut can be formed with a mechanical locking mechanism whereby one end of the strut is formed by a rod that is movable longitudinally relative to one member of the strut forming the second hinge point and is lockingly releasable in one direction of movement through means of a lock. To accomplish this, the strut employs a transfer member parallel to the rod that is operable by means of the leg to press the lock into the released position. It is further proposed that the lock be a tiltable plate with an opening through which the rod passes.

In an alternative embodiment, however, the strut can also be formed by a piston/cylinder unit whose piston rod is lockable in one direction of movement through means of a check valve. This results in not only a high reliability but also an extraordinarily responsive construction. For this, the piston/cylinder unit can employ a transfer member that is operable by means of the leg to press the check valve, or a valve in a bypass line to the check valve, into open position.

In order that the rear legs of the load transport carriage not extend to any great extent beyond the carriage, it is proposed that the legs be pivotable about an axle that is arranged laterally offset relative to the longitudinal axis of the legs.

Illustrated in the drawings are two examples of embodiments of the invention and these will be described in more detail in the following.

BRIEF DESCRIPTION OF THE DRAWING

FIG. 1 is a side view of a portion of a load transport carriage with a mechanical locking mechanism associated with the strut, and FIG. 2 is a sectional view of a hydraulically locking strut.

DESCRIPTION OF THE PREFERRED EMBODIMENTS

Journaled to the frame 1 of a load transport carriage are wheels 2 of an upper set of wheels that extend below the underside of the carriage and then support the carriage when this latter is on the loading surface 3 of a truck 4. Hinged to frame 1, about a horizontal axle 6 arranged at a right angle to the longitudinal axis of the carriage, are hollow legs 5, with the axle 6 being attached laterally to the surface of legs 5 so that the longitudinal axis of the legs 5 is displaced from the axle 6 by an amount corresponding to about half the width of the leg. Hinged at the top end of each leg 5, about an axle 7 parallel to the axle 6, is a beam 8 that supports a feeler wheel 9 at a distance from the axle 7 so that the feeler wheel is swingable about axle 7. The feeler wheel 9 can be attached to the beam 8, at different distances from axle 7, in holes 10, in order to be able to adapt the feeler wheel 9 to the characteristics of the particular truck.

In order that the rear legs of the load transport carriage not extend to any great extent beyond the carriage, it is proposed that the legs be pivotable about an axle that is arranged laterally offset relative to the longitudinal axis of the legs.

Attached at one end at a hinge point 12 and, at a distance from axle 7 corresponding to about one-third the distance of the axle 7 from the axle of the rear wheel 11', is a strut 11 whose other end is hinged at a point 13. The strut 11 includes a rod 14 that is formed with one end fastened at the hinge point 13 and guided inside a housing 15 of strut 11 which, on the side lying opposite to the side introducing the rod 14, forms the hinge point 12.

Located inside the housing 15, tiltable about a bearing point 16, is a plate 17 having an opening 18 which surrounds the cylindrical rod 14. The plate 17 wedges itself against the inner surface of the opening 18 when the rod 14 is pushed into the housing 15. The plate 17 is held by a resilient abutment 19, and a rod-shaped actuating member 20, coming in contact with plate 17 opposite to the abutment 19. The rod-shaped member 20 is guided parallel to the rod 14 inside the housing and is pressed by a spring 22 against a pin 21 on the side opposite to plate 17.

The contacting surface of pin 21 for the actuating member 20 is rounded and is mounted coaxial to hinge point 12 so that, even in the case of different angular positions of the strut 11 relative to the leg 5, the pin 21 can transfer a longitudinal movement to the member 20. The pin 21, that is displaceably attached to leg 5 at right angles to the longitudinal axis of the leg, is spring-loaded in a direction away from the strut and rests, with its end that is opposite to the member 20, against the beam 8 so that a movement of beam 8 toward the strut and against the pressure of the springs of the pin and of the member 20 presses the plate 17 into an unlocked position.

If the load transport carriage is to be pushed into the truck 4, the wheels 2 are first set down on the loading surface and the carriage pushed in, whereby projecting parts of the truck 4, in particular bumper rod 23, press the feeler wheel 9 back, hence actuating the beam 8 and the plate 17 so that the directional friction locking mechanism is unlocked and the strut telescopes together as it shortens. In this fashion, a continuously maintained pressure leads to an upward pivoting of the leg 5 into a horizontal position, and the carriage can be pushed further onto the truck so that feeler wheel 9 comes to rest on loading surface 3. The legs 5 are joined together by means of a horizontal tube 24 which, in the horizontal position of leg 5, rests against the underside of the frame 1.

MODIFICATION OF FIG. 2

Instead of a mechanical locking and blocking contrivance, there can also be a hydraulic strut like the one shown in FIG. 2. In place of housing 15, an external cylinder 15a is hinged to the leg 5. Extending out of the opposite side of cylinder 15a is a coaxial piston rod 14a, which is attached to hinge point 13. Located coaxially inside the cylinder 15a is an internal cylinder 25 inside of which slides a piston 26 that is connected with the pisto rod 14a. The flow of oil to the cylinder chamber of the internal cylinder 25, which is not occupied by the piston rod 14a, is controlled by means of a check valve 27 with a valve plate such that oil can flow into, but not out from, this cylinder chamber so that the piston rod can be drawn out from but not pushed into the unit. During an inflow of oil into this cylinder chamber, it flows out of the circular space 28 between the internal and external cylinder through an opening 29, the interior chamber 30 of the rod-shaped member 20a, biased in an outward direction by a spring, and through check valve 27 that is acted upon by a spring. Located within the circular space 28 is an air cushion that exerts a pressure on the oil, which insures that the piston rod 14a is not moved outwardly to allow the strut to cause descent of leg 5. Build-up of this air pressure is generated by swinging leg 5 upwardly.

For overcoming the locked position of the strut generated by the check valve 27, the hollow rod shaped member 20a has axial passages 31 at its inner end, which can align with axial passages 32 on the inside of the cylinder 25. These members form a valve allowing passage through a bypass line 34, bridging the valve 27, when rod like member 20a is pushed in against the biasing effect of its internal spring. In this fashion, pushing in of member 20a into the cylinder/piston unit results in a connection of the piston chamber with the circular chamber 28, past the valve 27, via the bypass 34 that is joined with the piston chamber, and passages 29 and 32.

What is claimed is:

1. A load transport carriage which is carried by a truck, the load transport carriage comprising: a carriage frame; a front pair of wheels at an upper level and being journaled to the carriage frame; a lower rear pair of wheels; a pair of legs behind the front pair of wheels hingedly attached to the carriage frame at one end and holding the lower pair of wheels at the other end, the legs being pivotable and lockable in an upright position; releasable locking mechanism for holding said legs in the upright position, the legs being movable upwardly to a position in which the front wheels and the rear wheels support the load transport carriage, said locking mechanism comprising a pair of struts each adjustable in length and hinged at one end to each leg and at its other end hinged to the carriage frame behind the pair of legs, each strut including means for locking the strut against extension as the strut becomes reduced in length and being operable independently of the other strut; and feeler wheels for releasing the locking mechanism of the legs, said feeler wheels being secured to the legs adjacent their upper ends and projecting downwardly to engage the truck as the carriage frame is moved forward to swing the legs up to an upper level similar to the level of the front pair of wheels.

2. A load transport carriage in accordance with claim 1 in which the legs have beams, the beams being hinged to the carriage frame and at least one of the feeler wheels is journaled to the beam, spring biased means for retaining the locking mechanism in a locked position such that the feeler wheel engages the spring biased means against a member of the strut to release the means for locking the strut.

3. A load transport carriage in accordance with claim 1 in which the strut has a movable rod like member and is hinged at an upper end to the carriage frame and releasably engages the means for locking the strut at another end wherein the means for locking the strut includes means for releasably locking the rod like member in one direction of movement, said releasable locking means comprising a directional frictional locking device, frictionally engaging the rod like member such that the strut holds the legs and lower wheels in the upright position.

4. A load transport carriage in accordance with claim 3 in which the strut further includes an actuating member parallel to the rod like member, the actuating member being actuated by movement of the leg and pressing the frictional locking device into a released position releasing the rod like member to permit the legs to move upwardly.

5. A load transport carriage in accordance with either claim 3 or claim 4 in which the frictional locking device comprises a tiltable plate with an opening through which the rod like member passes such that when the plate is tilted the rod like member is released.

6. A load transport carriage in accordance with claim 1 characterized by the fact that the strut is in the form of a cylinder unit in which there is a piston and a piston rod, the piston rod being hinged to the carriage frame at a free end and the cylinder unit being hinged to the leg at an opposite end from the free end, and movement of the piston rod in one direction of movement being prevented by a check valve.

7. A load transport carriage in accordance with claim 6 in which the cylinder unit includes an actuating member that is operable through movement of the leg upwardly which presses the check valve into an open position permitting the piston rod to move within the piston.

8. A load transport carriage in accordance with claim 1 in which the legs are pivotable about an axle that is laterally offset relative to the longitudinal axis of the legs in order that the legs not extend to any great extent beyond the carriage frame.

* * * * *